United States Patent [19]

Hoshino et al.

[11] Patent Number: 4,494,029

[45] Date of Patent: Jan. 15, 1985

[54] BRUSHGEAR

[75] Inventors: Michio Hoshino, Kashiwa; Riyouichi Someya, Matsudo, both of Japan

[73] Assignee: Mabuchi Motor Co., Ltd., Japan

[21] Appl. No.: 523,417

[22] Filed: Aug. 16, 1983

[30] Foreign Application Priority Data

Aug. 30, 1982 [JP] Japan .......................... 57-130936[U]

[51] Int. Cl.3 ............................................ H02K 13/00

[52] U.S. Cl. .................................... 310/239; 310/242; 310/248

[58] Field of Search ................. 310/71, 248, 249, 238, 310/239, 232, 91, 40 MM, 42, 246, 245, 229, 244, 242, 51, 240, 241, 247, 251, 89

[56] References Cited

U.S. PATENT DOCUMENTS

| | | | |
|---|---|---|---|
| 3,296,473 | 1/1967 | Mabuchi | 310/239 |
| 3,444,409 | 5/1969 | Latta | 310/244 |
| 3,450,916 | 6/1969 | Mabuchi | 310/244 |
| 3,475,635 | 10/1969 | Mabuchi | 310/238 |
| 3,733,573 | 5/1973 | Dieterich | 29/826 |
| 4,155,023 | 5/1979 | Hogenlocher | 310/246 |
| 4,195,242 | 3/1980 | Mabuchi | 310/244 |
| 4,254,353 | 3/1981 | Matsuda | 310/239 |

FOREIGN PATENT DOCUMENTS

| | | | |
|---|---|---|---|
| 68845 | 5/1980 | Japan | 310/51 |
| 71253 | 7/1982 | Japan | 310/248 |

*Primary Examiner*—R. Skudy

*Attorney, Agent, or Firm*—McGlew and Tuttle

[57] ABSTRACT

Brushgear having brushes, each comprising a terminal and a brush arm, both made of electrically conductive metal strips and joined together into one piece, the brushes being held in position on a side plate of a motor case, made of a synthetic resin, by being inserted into terminal holes provided on the motor case side plate. The terminal and brush arm of each brush are made of different metal strips and a terminal strip of the terminal and a brush strip of the brush arm are mechanically joined together into one piece by folding joining members provided integrally with the terminal strip in such a manner as to wrap around an end of the brush strip provided on the brush arm. The joined portion of the terminal and brush strips are inserted into the terminal hole to hold the brush in position on the motor case side plate.

13 Claims, 15 Drawing Figures

BRUSHGEAR

BACKGROUND OF THE INVENTION

1. Field of the Invention

This invention relates generally to brushgear, and more particularly to brushgear having brushes, each comprising a terminal and a brush arm, made of electrically conductive metal strips, the brushes being held in position by being inserted into terminal holes provided on a side plate of a motor case, made of a synthetic resin, in which the brushes are held securely in position by mechanically joining the terminal and the brush arm of each brush, which are formed of electrically conductive metal strips as independent components, into one piece.

2. Description of the Prior Art

In an electric motor, in general, it is necessary to keep the brushes and the commutator thereof in an excellent contact state.

FIGS. 1 through 7 are diagrams of assistance in explaining the prior art of brushgear.

In FIGS. 1 through 7, reference numeral 1 refers to a brush arm; 2 to a brush base; 3 to a terminal; 4 to a motor case side plate; 5 to a first support member; 6 to a second support member; 7 to a commutator; 8 to a reinforcement; 9 to an auxiliary support means; 10 and 10' to bent portions; 11 to a reinforcing portion; 12 to a terminal hole; 13 to a lanced and raised portion; 14 to a shouldered portion; 15 to a seat; 16 to a projection for spot welding; 17 to a spot weld and 18 to a gap, respectively.

A brush used in conventional types of brushgear, as illustrated in FIG. 1, comprises the brush arm 1, the brush base and the terminal 3, all of which are made of a thin electrically conductive metal strip and formed integrally, and the brush is three-point supported at the brush base 2 by the first support means 5 and 5 and the second support means 6 provided on the motor case side plate 4, made of a synthetic resin. The brush arm 1 is adapted to make elastic contact with the commutator 7, as shown in FIG. 2. Though not shown in the figure, the terminal 3 is passed through the motor case side plate 4 and led out for external connection.

As described above, it is essential for brushgear to keep the brush arm 1 in good contact with the commutator 7 at all times. In designing a motor, therefore, consideration must be given to how the brushes are securely supported at predetermined positions without loosening, or how vibrations due to the rotation of the commutator are prevented, or how the pushing force applied onto the commutator 7 is selected at a proper level. Particularly, in a small motor where marked improvements have recently been made to ensure the roundness of the commutator, the brushes have been increasingly constructed of thin resilient electrically conductive metal strips to improve the contact properties thereof to ensure positive contact with unwanted grooves on the commutator while minimizing the pushing force of the brush arm 1 onto the commutator 7. The thinner the brushes, the lower becomes the strength of each portion of the brushes. This may result in unstable support of the brush, or unwanted vibrations due to the revolution of the commutator 7. The unwanted vibrations are caused by a pulling or pushing force exerted in the direction shown by arrows in FIG. 2 by the frictional resistance of the brush arm 1 with the revolving commutator 7. That is, when the commutator 7 revolves clockwise, the brush arm 1 is pulled downward, causing the base 2 to warp into a shape shown by dotted lines in the figure, thus causing the brush arm 1 to be pushed downward (the reverse is the case with the counterclockwise revolution of the commutator). And, as the warpage of the brush base 2 exceeds a given limit, the brush arm 1 is rapidly returned to the original state thereof. In this way, during the revolution of the commutator 7, the brush arm 1 repeats the abovementioned warpage and restoration, resulting in vertical movements, that is, unwanted vibrations.

To overcome this problem, various improvements have been made on brushgear. The present applicant, has so far proposed a number of improvements on brushgear. For example, the present applicant has proposed an improvement where a reinforcement 8 is provided by embossing at the bent portion of the brush arm 1 and the brush base 2 and an auxiliary support means 9 is provided to support the reinforcement 8, as illustrated in FIG. 3, so as to prevent the vibrations of the brush arm 1 in the direction shown by arrows in FIG. 2. Furthermore, other improvements have also been proposed, as shown in FIGS. 4 and 5. In the improvement shown in FIG. 4, bent portions 10 and 10' and a reinforcing portion 11 are provided on the brush not only to reinforce the terminal 3 but also to reinforce the rigidity of the whole brush by forming the bent portion 10 integrally with the brush arm 1 and providing a reinforcing portion 11' at the bent portion of the brush arm 1 and the terminal 3. FIG. 5 shows the state where the brush reinforced in the abovementioned manner is securely held in position with a support means provided on the motor case side plate 4. In the support means shown in FIG. 5, the shouldered portion 14 is provided on the internal wall of the terminal hole 12 and caused to engage with the tip of the lanced and raised portion 13 formed by lancing and raising the terminal 3 shown in FIG. 4 to prevent the brush from falling off. Furthermore, the side edge at the foot of the brush arm 1 is supported by the seat 15 to prevent the brush arm 1 from loosening and twisting (Japanese Patent Unexamined Publication No. 71253–82).

In the foregoing, the conventional types of brushgear proposed by the present applicant have been described, referring to FIGS. 1 through 5. In any types of conventional brushgear, brushes are integrally formed using phosphor bronze, beryllium copper or any other material having good electrical conductivity and high resiliency. Phosphor bronze or beryllium copper as used in brushgear is suitable as a material for brush arms requiring resiliency, but not desirable as a material for terminals because of brittleness or soldering difficulty. In general, terminals should preferably be made of copper, brass or any other electrically conductive material which is easy to solder and flexible enough to withstand repeated bendin. Considering this fact, it has been conceived that terminals 3 and brush arms 1 are made of different materials suited for the respective purposes thereof and joined together into one piece by (i) staking with rivets, or (ii) spot welding.

The joining method (i), however, is not desirable because of the increased number of parts and manufacturing steps, while the joining method (ii) involves the difficulty in spot welding phosphor bronze or beryllium copper with copper or brass. In order to manage to spot weld these metals, projections 16 for spot welding have to be provided on the terminal 3, as shown in FIG. 6. FIG. 7 shows the state where the brush thus spot welded is fitted to a brush holding means. In FIG. 7, numeral 17 indicates the spot welded portions between the brush arm 1 and the terminal 3, accompanying a gap 18 in the joint portion. This gap is also found in the case of the joining method (i) using rivets. In this way, these joining methods cannot satisfactorily prevent the unwanted vibrations of the brush arm 1 resulting from the revolution of the commutator 7.

SUMMARY OF THE INVENTION

This invention is intended to overcome the aforementioned problems.

It is the first object of this invention to provide brushgear in which brush arms and terminals are formed separately using different materials suited for the respective purposes thereof.

It is the second object of this invention to provide brushgear where a highly resilient, relatively thin and electrically conductive metal strip (for example, of beryllium copper) is used as a suitable material for brush bases and brush strips.

It is the third object of this invention to provide brushgear wherein a relatively thick, electrically conductive metal strip (for example, of brass) which is easy to solder and flexible enough to withstand repeated bending is used as a suitable material for terminal strips, including joining members thereof.

It is the fourth object of this invention to provide brushgear wherein the brush arm and the terminal are mechanically joined with a simple and rational means to securely hold the brush arm in position.

It is the fifth object of this invention to provide brushgear wherein the joining means comprises a joining portion consisting of small joining members and a large joining member, both formed integrally with the terminal strip, the joining portion being folded and staked in such a manner as to wrap around an end of the brush to join the terminal strip with the brush strip into one piece.

It is the sixth object of this invention to provide brushgear wherein the joining portion has a lanced portion to ensure tight joining.

It is the seventh object of this invention to provide brushgear wherein a plurality (four pieces) of small joining members provided integrally with and on both sides of the terminal strip are folded and staked in such a manner as to wrap around an end of the brush strip to join the brush strip and the terminal strip into one piece.

It is the eighth object of this invention to provide brushgear wherein the joined portion of the brush base and the terminal strip is staked of spot welded to ensure tight joining.

It is the ninth object of this invention to provide brushgear wherein the joined portion is inserted into a terminal hole provided on a terminal support means to be held in position on a motor case side plate.

It is the tenth object of this invention to provide brushgear wherein the terminal support means on the motor case side plate has a terminal hole having a shape corresponding to the folded and joined portion of the brush, the terminal hole being formed into a size slightly smaller than the joined portion of the brush to enable the brush to be press-fitted positively onto the motor case side plate without recourse to any special engaging means.

These and other objects of the invention will become apparent from the following description taken in connection with the accompanying drawings.

DETAILED DSECRIPTION OF THE EMBODIMENT

Figure 1:
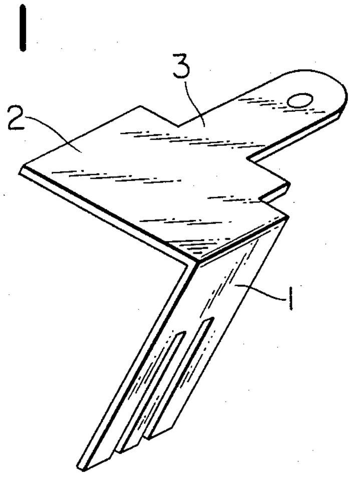
PRIOR ART FIG. 1
FIGS. 1 through 7 illustrating the conventional types of brushgear as described in the Description of the prior art.
Figure 2:
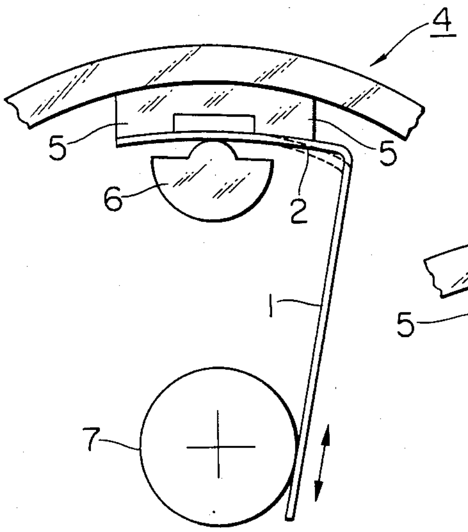
PRIOR ART FIG. 2
Figure 3:
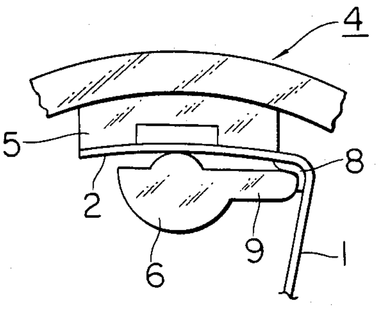
PRIOR ART FIG. 3
Figure 4:
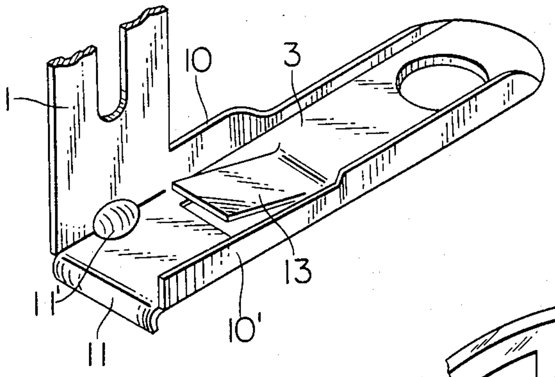
PRIOR ART FIG. 4
Figure 5:
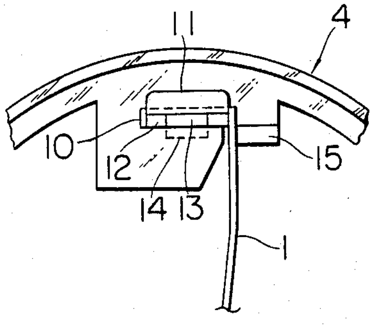
PRIOR ART FIG. 5

In FIGS. 8 through 12, reference numerals 2, 4 and 12 correspond with like numerals in FIGS. 1 through 7. Numeral 19 refers to a brush strip; 19' to a brush strip before bending; 20 to a terminal strip; 21 to a large joining member; 22 to a small joining member; 23 to a lanced portion; and 24 to a support means respectively. A brush arm of the invention thus comprises strip 19 (19') plus its base at 2 and the terminal comprises strip 20 with its joining members 21 and 22, and its lanced portion 23.

Figure 8A:
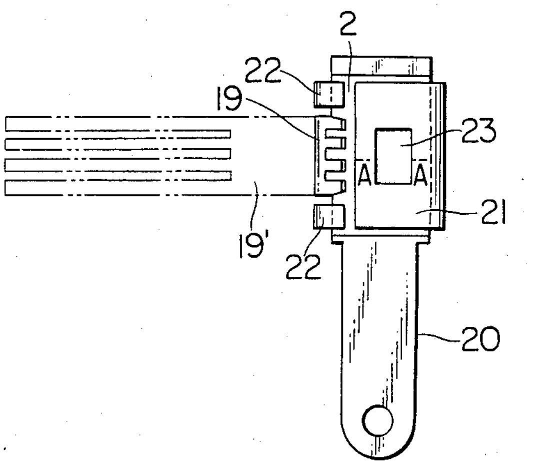
FIG. 8A is a diagram illustrating an example of brushgear joined with a joining method according to this invention.
Figure 8C:
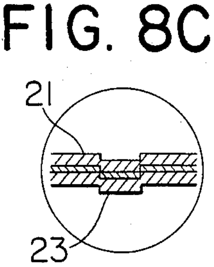
FIG. 8C is an enlarged side view of a lanced area of the brushgear.
Figure 8B:
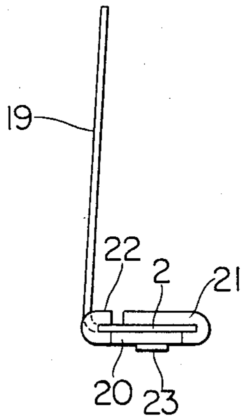
FIG. 8B is a side view of the example shown in FIG. 8A.

As materials for or brush arms used in this invention, a highly resilient, relatively thin and electrically conductive metal strip (for example, of beryllium copper having a thickness of 0.07 mm) is used for the brush base 2 and the brush strip 19 (forming the brush arm); and a relatively thick and electrically conductive metal strip (for example, of brass having a thickness of 0.3 mm), which is easy to solder and flexible enough to withstand repeated bending, is used for the terminal having its terminal strip 20, and including its joining means, as shown in FIG. 8. On the joining portion of the terminal strip 20 formed by stamping, the brush base 2 of the brush strip 19 formed by stamping is placed in a predetermined direction, as shown in FIG. 8A, and the large joining member 21 and two pieces of the small joining members 22 of the terminal strip 21 are folded and staked in such a manner as to wrap around the brush base 2, as shown in FIG. 8B to join the brush strip 19 and the terminal strip 20 into one piece. To ensure tight joining, a lanced portion 23 may be provided on the large joining member 21, as shown in FIG. 8A. FIG. 8C is a crosssectional view of the joined portion illustrating the details of the lanced portion.

Figure 9:
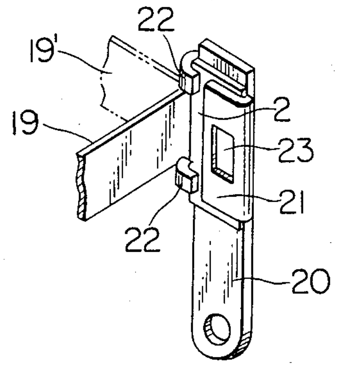
FIG. 9 is a perspective view of the example shown in FIG. 8A.

FIG. 9 is a perspective view of the brush (including brush arm and terminal) where the brush strip 19 and the terminal strip 20 are mechanically joined into one piece by folding and staking the large joining member 21 and the small joining memers 22 provided on the terminal strip 20 and on either side of brush strip 19. Numeral 19' in FIGS. 9 and 8A indicates the brush strip 19 before bending, shown in alternating long and two short dashes lines in the figures. The brush strip completed is shown by solid lines and identified by numeral 19.

Figure 10:
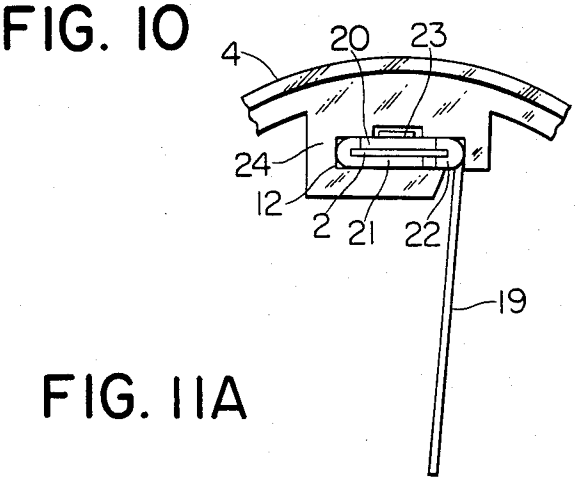
FIG. 10 is a diagram of assistance in explaining the state where the brushgear according to this invention is held in position.

FIG. 10 shows an example of a support means for supporting on the motor case side plate 4 the brush according to this invention where the brush strip 19 is bent at a predetermined angle with respect to the terminal strip 20 using the method described above. The support means shown in the figure is essentially the same as the support means in the conventional types of brushgear as described earlier. That is, the support means 24 on the motor case side plate 4 has the terminal hole 12 having a shape corresponding to the folded and joined portion of the brush according to this invention, as shown in FIG. 10. The height of the terminal hole 12 is made slightly smaller than the joined portion of the brush of this invention. The joined portion of the brush has some degree of resiliency due to the staking of the joining members, as described above. Consequently, when the joined portion of the brush is pressfitted into the terminal hole 12 which is made slightly smaller, an elastic engagement is effected by friction between the wall of the terminal hole 12 and the joined portion of the brush. This, together with the effect of the lanced portion 23, permits the brush to be positively secured on the motor case side plate without any special engaging means, preventing the unwanted vertical vibrations of the brush strip 19.

Figure 6:
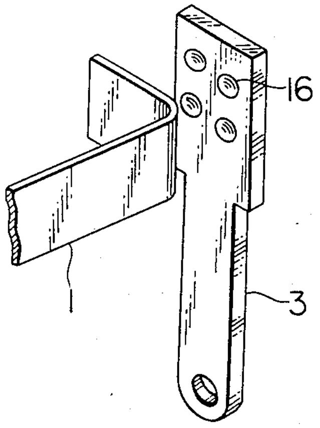
PRIOR ART FIG. 6
Figure 7:
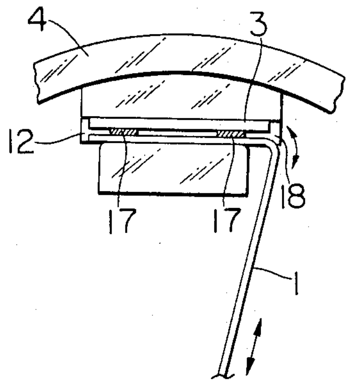
PRIOR ART FIG. 7
Figure 11A:
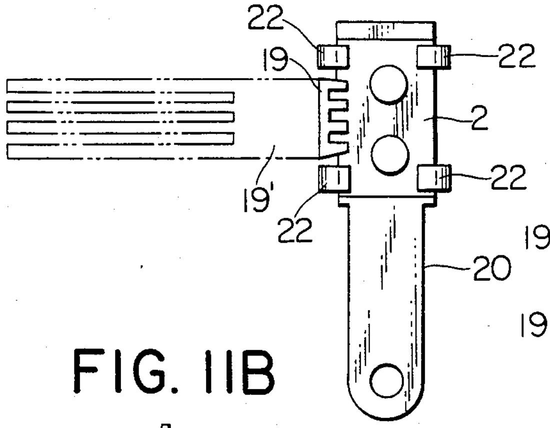
FIG. 11A is a diagram of assistance in explaining another example of brushgear joined with a joining method according to this invention.
Figure 12:
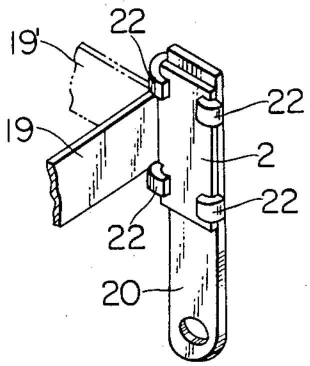
FIG. 12 is a perspective view of the example shown in FIG. 11A.
Figure 11B:
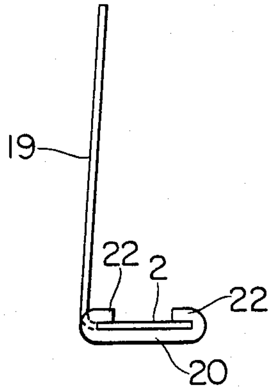
FIG. 11B is a side view of the example shown in FIG. 11A.

In another example of the brush joined with the joining method of this invention shown in FIGS. 11 and 12, the brush strip 19 is joined with the terminal strip 20 with four small joining members 22. To ensure tighter joining between the brush strip 19 and the terminal strip 20, the joined portion of the brush base 2 and the terminal strip 20 may be staked or spot welded, as shown in FIGS. 6 or 7. The detailed description of this arrangement, which is essentially the same as the description made referring to FIGS. 8 and 9, is omitted. Similarly, the description of the method for supporting the brush on the motor case, which is the same as the description made referring to FIG. 10, is omitted.

As described above, this invention makes it possible to construct the brush arm and terminal of the brush using materials suited to the respective purposes thereof, and mechanically join the brush arm and the terminal into one piece, and thereby the brush is supported stably and unwanted arcing between the commutator and the brush is prevented.

What is claimed is:

1. Brushgear having brushes, each comprising a terminal and a brush arm, made of electrically conductive metal strips and joined together into one piece, said brushes being held in position on a side plate of a motor case made of a synthetic resin, by being inserted into terminal holes provided on said motor case side plate; characterized in that said terminal has a terminal strip and joining members provided integrally with said terminal strip at an end of said terminal strip, and said brush arm has a brush base and a brush strip; the brush base being at least partly wrapped by said joining members which joining members are in a folded and depressed condition against said brush base; said terminal strip extending at a substantially right angle with respect to said brush strip with said terminal and said brush arm joined at a joined portion comprising said brush base and joining members; and the joined portion of said joining members and said brush base being inserted into one of the terminal holes.

2. Brushgear as claimed in claim 1 wherein said terminal strip, incorporating said joining members, of said terminal is made of a relatively thick, electrically conductive metal strip which is easy to solder and flexible enough to withstand folding.

3. Brushgear as claimed in claim 1 wherein said brush base and said brush strip of said brush arm are made of a highly resilient, relatively thin and electrically conductive metal strip.

4. Brushgear as claimed in claim 1 wherein said joining members for joining said terminal and said brush arm consists of small joining members and a large joining member, both being provided integrally with said terminal strip; said small and large joining members being folded and depressed in such a manner as to wrap around said brush arm to join said terminal and brush strips into one piece.

5. Brushgear as claimed in claim 4 wherein a lanced portion is provided at a predetermined position of said large joining member

6. Brushgear as claimed in claim 1 wherein the joined portion of said terminal strip and said brush base is staked.

7. Brushgear as claimed in claim 1 wherein the joined portion of said terminal strip and said brush base is spot welded.

8. Brushgear as claimed in claim 1 wherein a means for supporting said terminal strip on said motor case side plate comprises a terminal hole of a shape corresponding to the folded and joined portion of said brush; the height of said terminal hole being made slightly smaller than the joined portion of said brush.

9. Brushgear as claimed in claim 1 wherein said joining members comprise small joining members and are formed integrally with said terminal strip and provided in a predetermined number on both sides of said terminal strip; said small joining members being folded and depressed in such a manner as to wrap around an edge of said brush base to join said terminal and brush arm into one piece.

10. A brushgear for a motor case having a side plate and defining a terminal hole, comprising:

a brush arm having a brush strip and a brush base connected to said brush strip, said brush arm and brush base being made of a single sheet of conductive material; and a terminal having a terminal strip and a plurality of joining members extending from said terminal strip, said joining members and said terminal strip made of a single sheet of conductive material, each of said joining members being wrapped at least partly around said brush base for holding said brush arm to said terminal, said brush base with wrapped joining members and a portion of said terminal strip carrying said joining members being disposed in the terminal hole of the motor case.

11. A brushgear according to claim 10 wherein said conductive material of said brush arm is thinner than said conductive material of said terminal, said material of said brush arm being highly resilient compared to said material of said terminal, and said material of said terminal being flexible and more easily soldered, and capable of withstanding folding, than said material of said brush arm.

12. A brushgear according to claim 11 wherein said brush base and said portion of said terminal strip carrying said joining members are both flat and are stacked one on top of the other in the terminal hole of the motor case.

13. A brushgear according to claim 12 wherein the terminal hole of the motor case is slightly narrower in width than the stacked brush base and terminal portion with wrapped joining members whereby said wrapped joining members are held firmly to said brush base.

* * * * *